United States Patent [19]
Vukovich et al.

[11] Patent Number: 5,129,274
[45] Date of Patent: Jul. 14, 1992

[54] ELECTRO-HYDRAULIC SHIFT INTERLOCK APPARATUS FOR AN AUTOMATIC TRANSMISSION

[75] Inventor: William J. Vukovich, Ypsilanti, Walter J. Ortmann, Ann Arbor, both of Mich.

[73] Assignee: General Motors Corporation, Detroit, Mich.

[21] Appl. No.: 755,957

[22] Filed: Sep. 6, 1991

[51] Int. Cl.$^5$ ............................................. B60K 41/08
[52] U.S. Cl. ........................................ 74/335; 74/866; 74/867; 364/424.1
[58] Field of Search ............... 74/859, 860, 861, 866, 74/867, 335, 483 R; 364/424.1

[56] References Cited

U.S. PATENT DOCUMENTS

| | | | |
|---|---|---|---|
| 3,750,495 | 8/1973 | Ito et al. | 74/866 |
| 3,987,686 | 10/1976 | Paplaski | 74/476 |
| 4,354,236 | 10/1982 | Miki et al. | 74/866 X |
| 4,367,528 | 1/1983 | Kawamoto et al. | 74/866 X |
| 4,476,530 | 10/1984 | Pannier et al. | 74/866 X |
| 4,488,456 | 12/1984 | Taga et al. | 74/866 |
| 4,501,175 | 2/1985 | Tatsumi | 74/866 X |
| 4,763,545 | 8/1988 | Shibayama et al. | 74/866 X |
| 4,793,378 | 12/1988 | Loeffler et al. | 137/560 |
| 4,846,022 | 7/1989 | Ito et al. | 74/866 |

Primary Examiner—Richard Lorence
Assistant Examiner—William O. Trousdell
Attorney, Agent, or Firm—Mark A. Navarre

[57] ABSTRACT

A shift interlock mechanism for an automatic transmission includes electro-hydraulic elements internal to the transmission which are operable to inhibit the supply of fluid pressure for engaging the forward and reverse speed ranges of the transmission. The electro-hydraulic elements are activated in response to various operating parameters of the vehicle, including range selector position, engine throttle position, depression of the service brake pedal, vehicle speed, etc. The mechanism does not interfere with movement of the transmission range selector, and includes a mechanical link for overriding the interlock function when the range selector is moved to a LO forward range, thereby providing an override in the event of a failure of the electro-hydraulic elements.

6 Claims, 4 Drawing Sheets

ELECTRO-HYDRAULIC SHIFT INTERLOCK APPARATUS FOR AN AUTOMATIC TRANSMISSION

This invention relates to shift interlock controls for motor vehicle automatic transmissions, and more particularly, to a shift interlock control apparatus utilizing electro-hydraulic control elements.

Background of the Invention

In certain automotive automatic transmission installations, manufacturers have provided shift interlock devices which prevent the operator from moving the transmission range selector in certain ways. For example, some devices prevent the selector from being moved out of the Park position unless the pedal which operates the service brakes is depressed. Others prevent the selector from being moved to the Reverse position unless the vehicle is stopped. Such devices are typically electro-mechanical in nature, and require substantial modification of the conventional range selector. Moreover, there has been no provision of a mechanism for overriding the interlock in the event of a failure of the interlock device.

Summary of the Present Invention

The present invention is directed to an improved shift interlock mechanism for an automatic transmission, including electro-hydraulic elements internal to the transmission which are operable to inhibit the supply of fluid pressure for engaging the forward and reverse speed ranges of the transmission. The electro-hydraulic elements are activated in response to various operating parameters of the vehicle, including range selector position, depression of the service brake pedal and vehicle speed. The mechanism does not interfere with movement of the transmission range selector, and includes a mechanical link for overriding the interlock function when the range selector is moved to a LO forward range, thereby providing an override in the event of a failure of the electro-hydraulic elements.

Brief Description of the Invention

Detailed Description of the Invention

Figure 1:
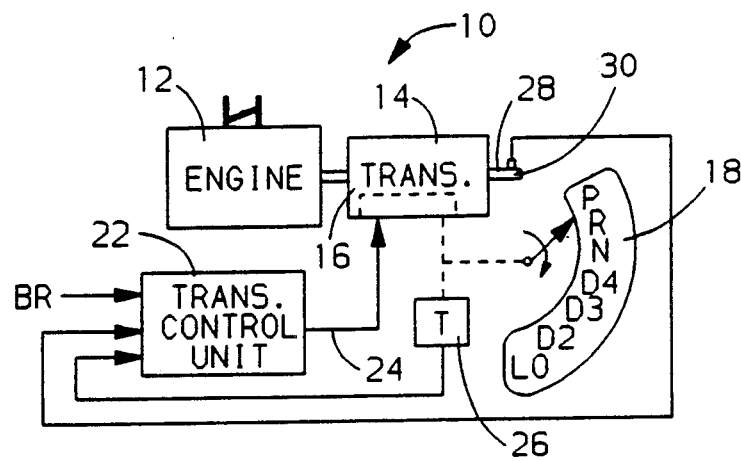
FIG. 1 is a schematic diagram of a vehicle powertrain including an automatic transmission and a computer-based control unit for activating the electro-hydraulic interlock mechanism of this invention.

Referring to FIG. 1, the reference numeral 10 generally designates a motor vehicle powertrain including an internal combustion engine 12 connected to drive the drive wheels of a vehicle (not shown) through an automatic shift power transmission 14. The transmission 14 embodies a number of conventional elements, including a fluidic torque converter for receiving engine torque, gearset elements, and a number of fluid operated torque transmitting devices through which the engine torque is transmitted to the drive wheels of the vehicle.

The reference numeral 16 designates a fluid supply circuit internal to the transmission 14 for developing fluid pressure for engaging the various torque transmitting devices of the transmission. The fluid supply circuit receives control inputs from a range selector 18 via mechanical linkage 20, and from a computer-based control unit 22 via line 24. The range selector is manipulated by the operator of the vehicle for initiating a shift to a desired speed range of the transmission. In the illustrated embodiment, the transmission 14 provides four forward speed ratios, and the ranges include Park, Reverse, Neutral, Drive, D3, D2 and LO. As described below, the development of forward and reverse operating pressures within transmission 14 is normally controlled by the range selector 18, and the control unit 22 is operative under certain conditions to inhibit the development of such operating pressures. The fluid supply circuit 16 is described below in detail in reference to FIG. 2.

The control unit 22 operates in response to a number of vehicle operating parameters including the velocity of transmission output shaft 28, the position of range selector 18, and a service brake indicator (BR). Various transducers including the range selector transducer 26 and the output speed transducer 30 are depicted in FIG. 1. The control of fluid supply circuit 16 is disclosed in detail below in reference to the flow diagrams of FIGS. 3-5.

Figure 2:
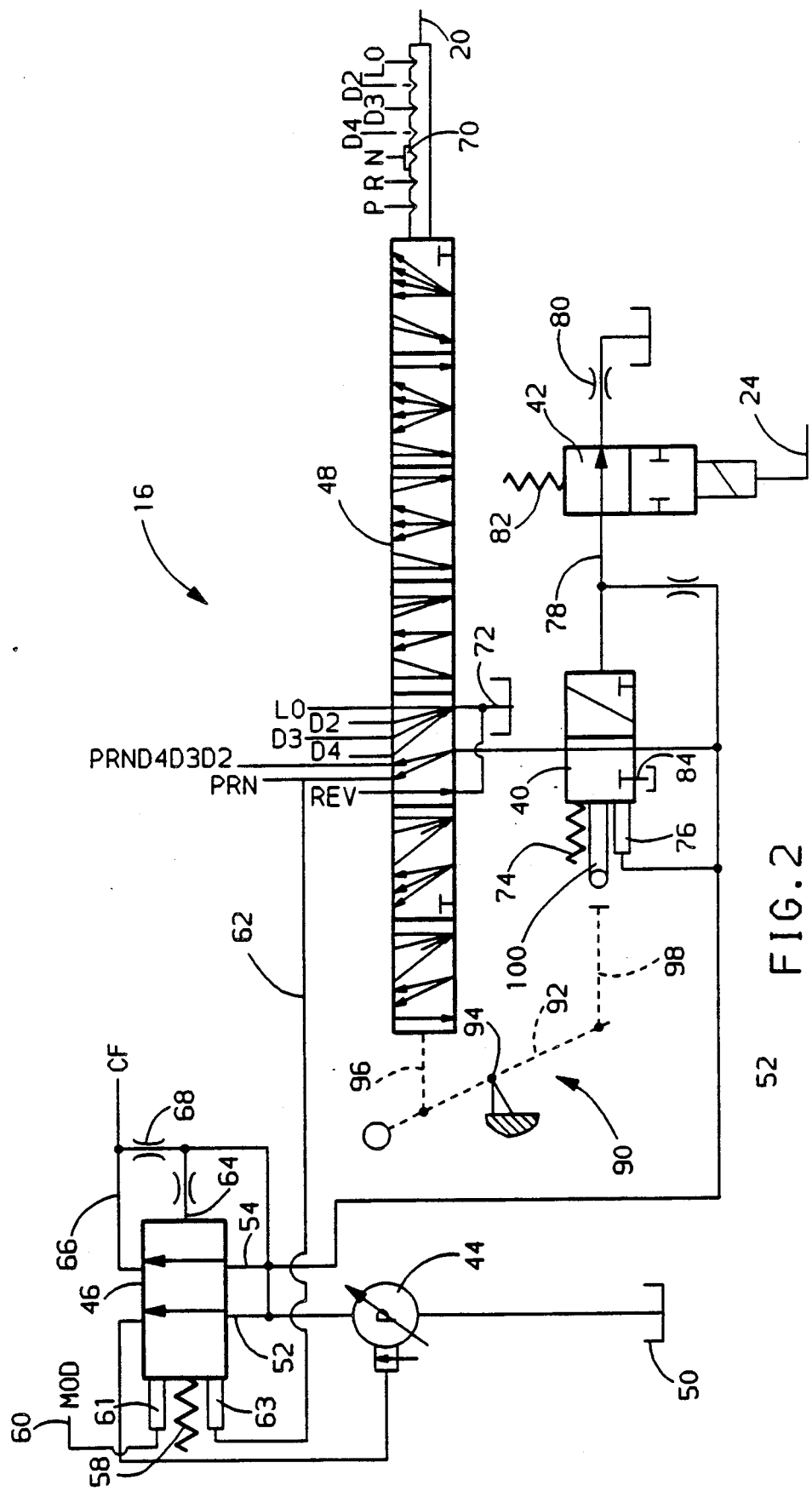
FIG. 2 is a hydraulic diagram of the electro-hydraulic interlock mechanism of this invention.

Referring to FIG. 2, the fluid supply circuit 16 comprises a shift interlock valve 40, a shift interlock solenoid 42, and a number of conventional elements including a variable capacity pump 44, a pressure regulator valve 46 and a manual valve 48. The pump 44 supplies fluid pressure from reservoir 50 to pressure regulator valve 46 via lines 52 and 54. Pressure regulator valve 46 regulates the fluid pressure in lines 52 and 54, referred to as LINE pressure, by controlling the pump capacity via line 56. The control is influenced by the net force of spring 58, modulator pressure (MOD) in line 60, PRN pressure in line 62, and orificed LINE pressure in line 64, the MOD and PRN pressures being applied to small pilot areas 61 and 63, respectively.

The PRN pressure is developed by manual valve 48 as described below, and is normally present when the operator selects the Park, Neutral or Reverse ranges of transmission 14. The modulator (MOD) pressure is typically developed as a function of engine output torque so that the LINE pressure varies accordingly. A second regulated pressure is directed to the torque converter (not shown) via converter feed (CF) line 66. The LINE pressure is also directed to converter feed line 66 via orifice 68.

The LINE pressure in line 52 is supplied to the various torque transmitting devices of transmission 14 via manual valve 48, which selectively distributes fluid pressure among the supply lines designated as REV, PRN, PRND4D3D2, D4, D3, D2 and LO. The distribution of fluid pressure is determined by the range selector 18, which is mechanically coupled to manual valve 48 for effecting linear displacement of the same. A detent mechanism 70 defines predefined positions for each range. The supply lines REV, D4, D3, D2 and LO each receive LINE pressure only when the corresponding range is selected. As noted above with respect to pressure regulator valve 46, the supply line PRN receives LINE pressure when the Park, Reverse or Neutral ranges are selected. The supply line PRND4D3D2 receives LINE pressure except when the LO range is selected. Any supply line not receiving LINE pressure is exhausted via line 72. In FIG. 2, the manual valve is illustrated in the Neutral position. In this case, LINE pressure is supplied to the PRN and PRND4D3D2 supply lines, and the supply lines REV, D4, D3, D2 and LO are exhausted.

Shift interlock valve 40 and shift interlock solenoid valve 42 are two-state devices, and each is illustrated in its default (normal) state. The default state of solenoid valve 42 is ensured by the force of spring 82. The default state of interlock valve 40 is ensured by the combined forces of spring 74 and LINE pressure which is applied to the small pilot area 76.

In the default state, orificed LINE pressure in line 78 is exhausted via solenoid valve 42 and orifice 80, and shift interlock valve 40 provides a direct path through which LINE pressure in line 52 is supplied to manual valve 48. In the active state, the control unit 22 energizes solenoid valve 42 via line 24 to shift the valve upward as viewed in FIG. 2. This blocks the exhaust path so that the orificed LINE pressure in line 78 overcomes the combined bias force of spring 74 and the bias pressure applied to area 76 of shift interlock valve 40. In this state, the shift interlock valve 40 shifts leftward as viewed in FIG. 2 to block the supply of LINE pressure to manual valve 48, and to exhaust the residual fluid in the supply lines via exhaust port 84. When the solenoid valve 42 is no longer energized, the valves 40 and 42 revert to their default state, re-directing LINE pressure to manual valve 48. The control logic employed by control unit 22 concerning the energization of solenoid valve 42 is described below in reference to the flow diagrams of FIGS. 3-5.

According to another aspect of this invention, the fluid pressure supply circuit 16 includes a mechanism 90 for mechanically overriding the shift interlock function of valves 40 and 42 in the event of a fault condition which maintains interlock valve 40 in its active state. In the illustrated embodiment, the mechanism 90 comprises a simple lever 92 pivoted about the point 94. One end of lever 92 is connected to manual valve 48 via input link 96, and the other end of lever 92 is connected to output link 98. The output link 98 is adapted to engage a bias land 100 formed on the shift interlock valve 40 when the manual valve 48 is shifted to the LO position, mechanically forcing the valve 40 to the illustrated default position. Thus, if a fault condition causes the shift interlock valve 40 to interrupt the supply of LINE pressure to manual valve 48, the operator of the vehicle may override valve 40 by moving the range selector 18 to the LO position.

Figure 5:
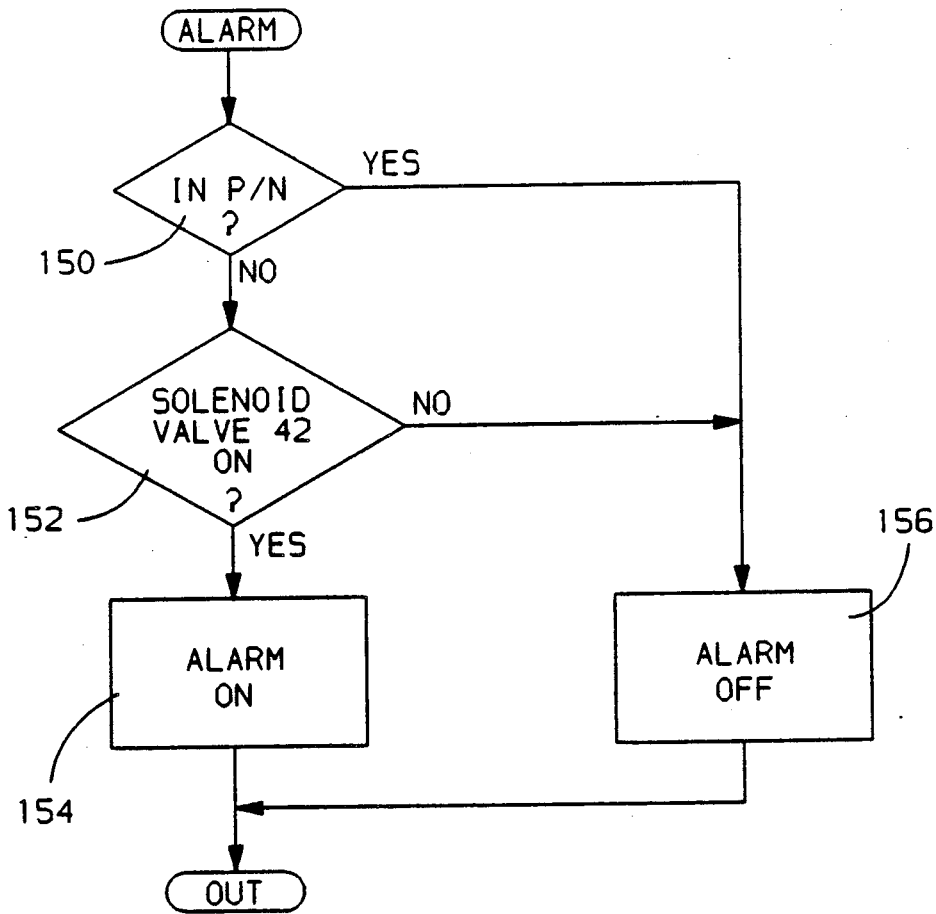
FIGS. 3, 4 and 5 are flow diagrams representative of computer program instructions executed by the computer-based control unit of FIG. 1 in controlling the operation of the electro-hydraulic interlock mechanism of FIG. 2.
Figure 3:
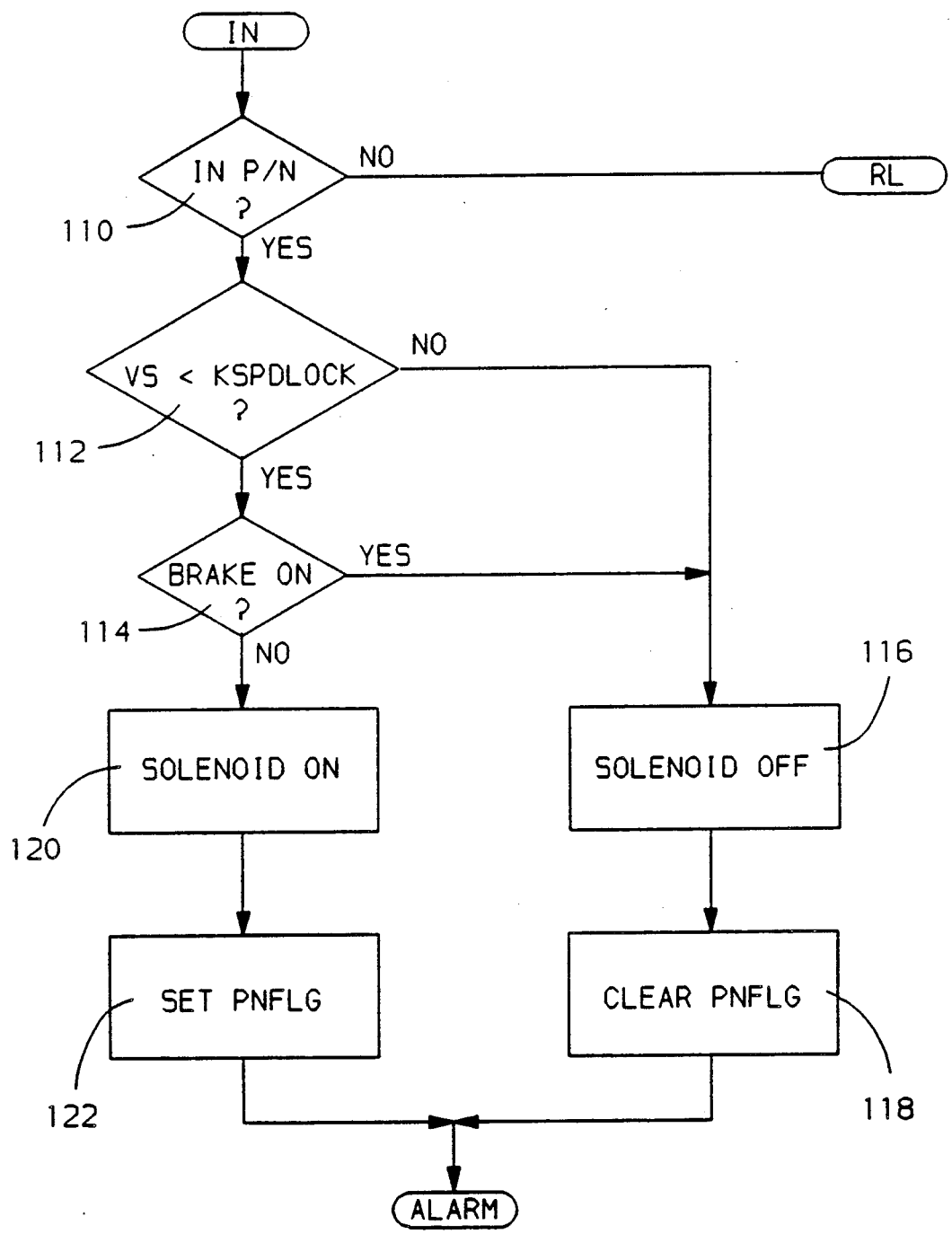
Figure 4:
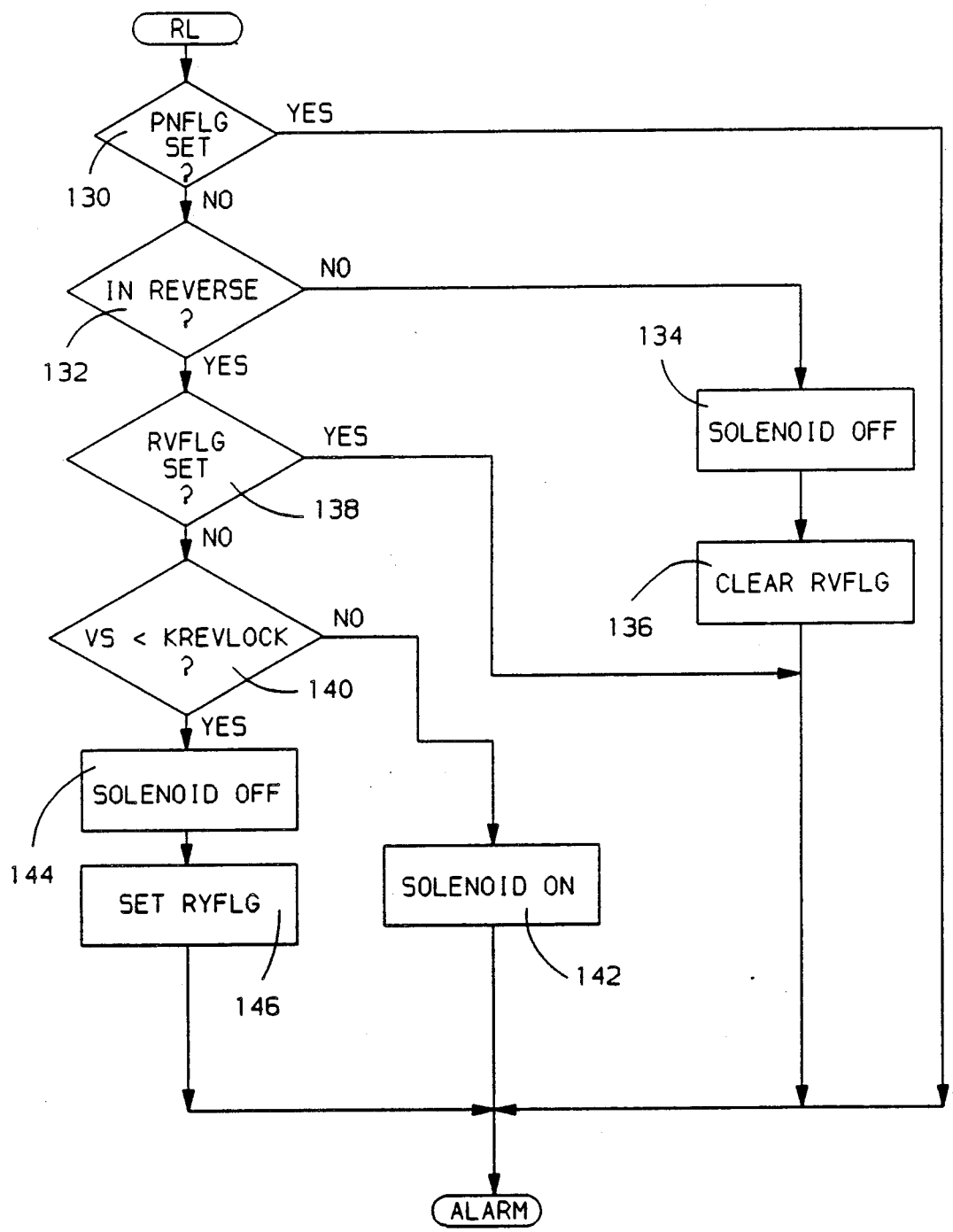

The control logic employed by control unit 22 in controlling the energization of solenoid valve 40 is represented by the flow diagrams of FIGS. 3-5. The various instructions and decisions set forth therein represent computer program instructions executed by the computer-based control unit 22. In the illustrated embodiment, the program is part of an overall transmission control program executed by the control unit 22; entry to and exit from the interlock program are indicated by the ENTER and RETURN blocks in FIGS. 3 and 5, respectively.

In the illustrated embodiment, the interlock control logic performs two primary functions: energizing the interlock solenoid 42 (1) when the range selector 18 is in Park or Neutral to prevent engagement of a forward or reverse speed range, and (2) when the range selector 18 is moved to the Reverse position to prevent an ill-advised shift to Reverse. The Park/Neutral (P/N) logic is depicted in FIG. 3, and the Reverse Lock-out (RL) logic is depicted in FIG. 4. FIG. 5 depicts logic for sounding an audible alarm (not shown).

If the range selector 18 is in Park or Neutral, as determined by the decision block 110 of FIG. 3, the blocks 112-122 are executed to determine if a shift interlock should be initiated, as indicated by the status of the PNFLG flag. The solenoid valve 42 is energized and the PNFLG flag set by blocks 120 and 122 if decision blocks 112 and 114 determine that the vehicle speed (VS) is less than a reference (KSPDLOCK) and the service brake pedal is not depressed. The solenoid valve 42 is deenergized and the PNFLG flag cleared by blocks 116 and 118 if decision blocks 112 and 114 determine that the vehicle speed (VS) is greater than or equal to the reference speed KSPDLOCK or the service brake pedal is depressed.

The reverse lock-out logic (RL) of FIG. 4 is executed whenever the range selector is in a position other than Park or Neutral, unless the PNFLG flag is set, as determined by blocks 110 an 130. The blocks 132-146 are executed to determine if a reverse lock-out should be initiated, as indicated by the status of the RVFLG flag. If the range selector is moved to the Reverse position prior to the RVFLG flag being set (as determined at blocks 132 and 138), the solenoid valve 42 will be energized by block 142 to lock-out the Reverse range if the vehicle speed (VS) is greater than or equal to a reference speed KREVLOCK (as determined at block 140). If the vehicle speed VS is less than the reference KREVLOCK, the solenoid valve 42 is deenergized and the RVFLG flag set by blocks 144 and 146. Thereafter, the status of the RVFLG flag will prevent the energization of solenoid valve 42 when the vehicle speed falls below the reference speed KREVLOCK. When the range selector 18 is moved out of the Reverse position, the solenoid valve 42 is deenergized and the RVFLG flag cleared by blocks 134 and 136 to reset the reverse lock-out logic.

Referring to the alarm logic of FIG. 5, the blocks 150-154 sound the audible alarm whenever the range selector 18 is in a position other than Park or Neutral and the solenoid valve 42 is energized. Otherwise, the block 156 is executed to turn off the alarm.

While this invention has been described in reference to the illustrated embodiment, it is expected that various modifications will occur to those skilled in the art. For example, many of the fluid pressure supply elements described in reference to FIG. 2 are purely illustrative and not required to practice the subject invention. Thus, it should be understood that systems including such modifications may fall within the scope of the present invention, which is defined by the appended claims.

The embodiments of the invention in which an exclusive property or privilege is claimed are defined as follows:

1. Control apparatus for a transmission of a motor vehicle including a range selector adapted to be manipulated by a vehicle operator for initiating a shift to a desired speed range of the transmission and a manual valve which is displaced in relation to the range selector manipulation to direct a supplied fluid pressure to various fluid operated elements of said transmission for effecting a shift to said desired speed range, the control apparatus comprising:

electro-hydraulic valve means selectively actuable to interrupt said supply of fluid pressure to said manual valve; and control means for defining a vehicle operating condition to be satisfied at the initiation of shifting to said desired speed range, and for actuating said electro-hydraulic valve means if said vehicle operating condition is not satisfied at the time of said range selector manipulation.

2. The control apparatus set forth in claim 1, including:

means for biasing said electro-hydraulic valve means to a default state in which the supply of fluid pressure to said manual valve is maintained, the electro-hydraulic valve means being biased to an active state when actuated to interrupt said supply of fluid pressure to said manual valve 3. The control apparatus set forth in claim 2, wherein said range selector is positionable to select a specified forward speed range of said transmission and said control apparatus includes:

means coupled to said manual valve for mechanically biasing said electro-hydraulic valve means to said default state when the operator manipulates said range selector to select said specified forward speed range.

4. Control apparatus for a transmission of a motor vehicle including a range selector adapted to be manipulated by a vehicle operator for initiating a shift to a desired speed range of the transmission, a source of fluid pressure, and a manual valve which is displaced in relation to the range selector manipulation to direct said fluid pressure to various fluid operated elements of said transmission for effecting a shift to said desired speed range, the control apparatus comprising:

interlock valve means connected in a fluid path between said source of fluid pressure and said manual valve, and having a first state in which said fluid pressure is supplied to said manual valve via said fluid path and a second state in which said supply of fluid pressure to said manual valve is interrupted;

solenoid valve means electrically actuable to selectively switch said interlock valve means between said first and second states; and control means for defining a vehicle operating condition to be satisfied at the initiation of shifting to said desired speed range, and for actuating said solenoid valve means to inhibit operator initiated shifting to said desired speed range if said vehicle operating condition is not satisfied at the time of said range selector manipulation.

5. The control apparatus set forth in claim 4, wherein:

said interlock valve means is normally biased to said first state, and said solenoid valve means is effective when actuated by said control means to bias said interlock valve means to said second state.

6. The control apparatus set forth in claim 4, wherein said range selector is positionable to select a specified forward speed range of said transmission and said control apparatus includes:

means coupled to said manual valve for mechanically biasing said interlock valve means to said first state when the operator manipulates said range selector to select said specified forward speed range.

* * * * *